United States Patent
Williams et al.

(10) Patent No.: US 12,554,112 B2
(45) Date of Patent: Feb. 17, 2026

(54) METHOD OF CALIBRATING A SYSTEM FOR READING BIREFRINGENT DATA

(71) Applicant: Microsoft Technology Licensing, LLC, Redmond, WA (US)

(72) Inventors: Hugh Williams, Cambridge (GB); Ariel Gomez Diaz, Cambridge (GB); Charles Ernest Whittaker, Cambridge (GB); James Hilton Clegg, Cambridge (GB); Richard John Black, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 418 days.

(21) Appl. No.: 18/158,582

(22) Filed: Jan. 24, 2023

(65) Prior Publication Data

US 2024/0248292 A1 Jul. 25, 2024

(51) Int. Cl.
*G02B 21/00* (2006.01)
*G02B 21/06* (2006.01)
*G02B 21/26* (2006.01)

(52) U.S. Cl.
CPC ............. *G02B 21/06* (2013.01); *G02B 21/26* (2013.01)

(58) Field of Classification Search
CPC ...... G02B 21/06; G02B 21/26; G02B 21/365; G02B 21/0092
See application file for complete search history.

(56) References Cited

U.S. PATENT DOCUMENTS

| | | | |
|---|---|---|---|
| 9,625,369 B2 * | 4/2017 | Shribak | G02B 27/286 |
| 11,341,620 B2 | 5/2022 | Gomez Diaz et al. | |
| 11,422,086 B2 | 8/2022 | Gomez Diaz et al. | |
| 2016/0154229 A1 * | 6/2016 | Milner | G01N 21/23 348/79 |
| 2019/0056212 A1 * | 2/2019 | Zhu | G01B 9/02007 |
| 2021/0349010 A1 * | 11/2021 | Gomez Diaz | G11B 7/1395 |
| 2021/0350510 A1 | 11/2021 | Gomez Diaz et al. | |

OTHER PUBLICATIONS

International Search Report and Written Opinion received for PCT Application No. PCT/US24/10968, Apr. 29, 2024, 17 pages.
Oldenbourg, Rudolf, "Polarization microscopy with the LC-PolScope Table of Contents Introduction." Live cell imaging: A laboratory manual, Nov. 2003, pp. 1-42.
"What is OpenPolScope ?", Retrieved from: https://openpolscope.org/, May 8, 2019, 1 Page.
Shribak, et al., "Techniques for Fast and Sensitive Measurements of Two-Dimensional Birefringence Distributions", In Journal of Applied Optics, vol. 42, Issue 16, Jun. 1, 2003, pp. 3009-3017.

* cited by examiner

*Primary Examiner* — Mustak Choudhury
(74) *Attorney, Agent, or Firm* — Alleman Hall LLP

(57) ABSTRACT

A method of calibrating a polarized light microscope comprises placing an optical data storage medium in a sample stage of the polarized light microscope, the optical data storage medium comprising a substrate having birefringent voxels embedded therein; measuring a background birefringence of the optical data storage medium; adjusting the polarized light microscope to compensate for the background birefringence. By correcting for background birefringence, image contrast may be improved. Further improvements may be obtained by optimizing swing angles of measurement states after compensating for the background birefringence. Also provided is a method of reading data from a birefringent optical data storage medium, and a system useful for implementing the methods.

20 Claims, 7 Drawing Sheets

METHOD OF CALIBRATING A SYSTEM FOR READING BIREFRINGENT DATA

BACKGROUND

There is substantial demand for data storage. It is estimated that cloud storage providers will in the near future need data storage capacities of the order of zettabytes, a zettabyte being one trillion gigabytes ($10^{21}$ bytes). Much of the data will need to be stored for extended periods of time.

Examples of data storage technologies currently in widespread use include hard disk drives, magnetic tape, flash memory, and optical discs. All of these technologies have drawbacks which require data to be periodically copied onto replacement media. This is costly in terms of both energy usage and hardware requirements.

Magnetic storage media such as hard drives and magnetic tape suffer from gradual demagnetization. Flash memory is subject to read disturb effects, where repeatedly reading from a particular flash cell causes failure of surrounding flash cells. The reflective materials used for data storage in optical media such as DVDs degrade over time.

Birefringent optical data storage media have been proposed as a solution to these drawbacks. A birefringent optical data storage medium comprises a transparent substrate, such as a quartz glass substrate. Data are encoded in 3-dimensional nanostructures formed in the substrate. These nanostructures are referred to as voxels.

A voxel has optical properties which differ from those of the surrounding bulk substrate. In particular, voxels are birefringent, and in other words display different refractive indices depending upon the polarization and/or direction of incident light. The optical properties of the voxels can be controlled at the time the voxels are written into the substrate. The optical properties of the voxels are used to encode data.

Birefringent optical data storage media and their manufacture have been described by e.g. Anderson et al, Glass: A New Media for a New Era? 10th USENIX Workshop on Hot Topics in Storage and File Systems (HotStorage 18), 2018; and in U.S. Pat. No. 10,236,027 B1.

SUMMARY

One aspect provides a method of calibrating a polarized light microscope. The method comprises placing an optical data storage medium in a sample stage of the polarized light microscope, the optical data storage medium comprising a substrate having birefringent voxels embedded therein; measuring a background birefringence of the optical data storage medium; and adjusting the polarized light microscope to compensate for the background birefringence.

Another aspect provides a method of reading data from a birefringent optical data storage medium. The method comprises positioning the birefringent optical data storage medium in a sample stage of a polarized light microscope, wherein the birefringent optical data storage medium comprises a substrate having birefringent voxels embedded therein. Then, with the birefringent optical data storage medium in a light path of the polarized light microscope, the polarized light microscope is calibrated by measuring a background birefringence of the optical data storage medium, wherein a voxel is in a light path of the polarized light microscope during the measurement; and adjusting the polarized light microscope to compensate for the background birefringence. After calibrating the polarized light microscope, the polarized light microscope is subsequently used to capture an image of a voxel using elliptically-polarized light. The plurality of images is then processed using a processor to recover the data.

Still another aspect provides a system for reading data from a birefringent optical data storage medium. The system comprises a light source for emitting light along a light path; a polarization state generator on the light path, the polarization state generator being configured to receive light from the light source and to output circularly- or elliptically-polarized light in an input state; a sample stage, wherein the sample stage is configured to hold an optical data storage medium on the light path, downstream of the polarization stage generator; a polarization state analyzer on the light path downstream of the sample stage; a light detector for detecting light in a detection state, the light detector being on the light path downstream of the polarization state analyzer; and a controller comprising a processor and memory storing computer-executable instructions. When executed by the processor, the computer-executable instructions cause the processor to control the system to measure a background birefringence of an optical data storage medium held by the sample stage; and adjust the polarization state generator and/or the polarization state analyzer to compensate for the background birefringence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

The drawings are schematic, and are not to scale. Relative sizes of certain elements are exaggerated for clarity of representation.

DETAILED DESCRIPTION

Directional terms such as "top", "bottom", "left", "right", "above", "below", "horizontal" and "vertical" are used herein for convenience of description, and refer to the orientation shown in the relevant drawing. For the avoidance of any doubt, this terminology is not intended to limit orientation in an external frame of reference.

Described herein is a method of calibrating a system for reading a birefringent optical data storage medium, and a system which implements the method.

Figure 1:
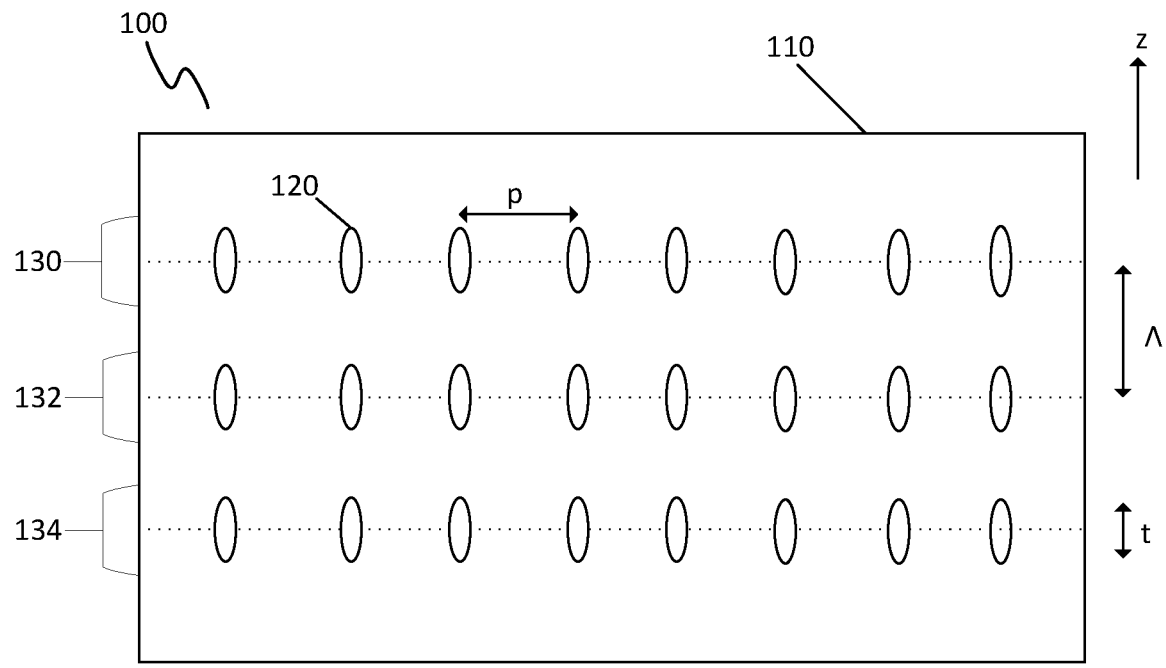
FIG. 1 is a cross-section of an example birefringent optical storage medium.
Figure 2:
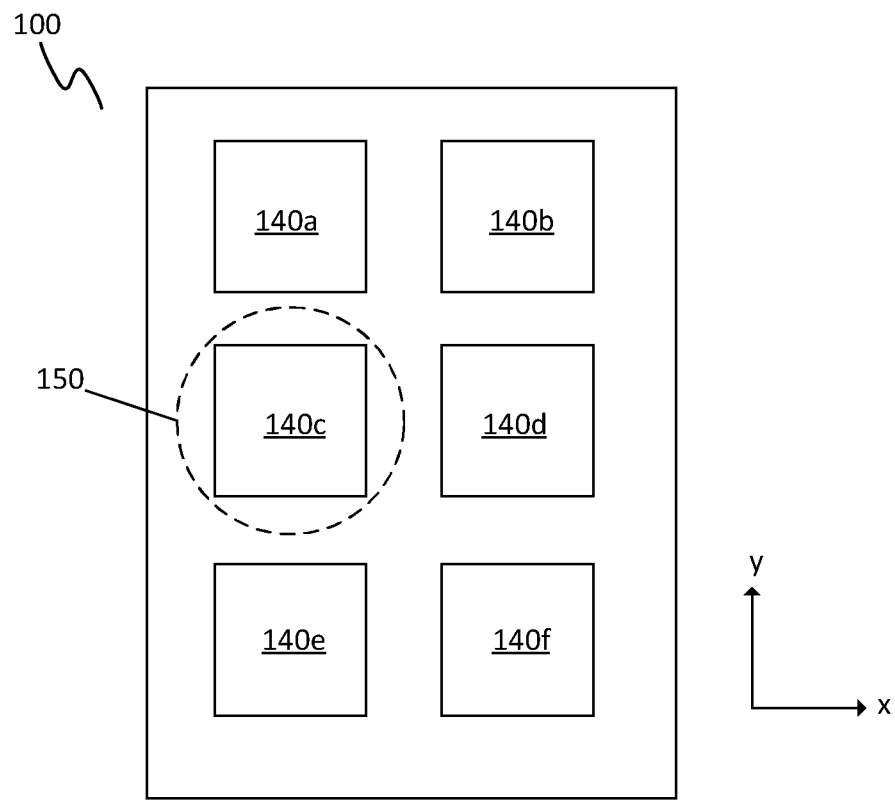
FIG. 2 is a plan view of the birefringent optical data storage medium.

The structure of an example birefringent optical data storage medium will first be explained with reference to FIGS. 1 and 2. FIG. 1 is a schematic cross-section of the multi-layered optical data storage medium, and FIG. 2 is a schematic plan view of the multi-layered optical data storage medium.

The data storage medium 100 comprises a substrate 110. The substrate 110 may comprise glass, in particular fused quartz. Fused quartz may also be referred to as silica glass. Glass has excellent chemical stability, and data storage media based on glass substrates have an expected lifespan extending to hundreds of years. As such, optical data storage media are useful for long-term archival of data.

The substrate may have a thickness of up to 10 mm, optionally up to 5 mm, further optionally 200 µm to 2 mm.

The shape of the substrate 110 is not particularly limited. FIGS. 1 and 2 illustrate a cuboid substrate.

A plurality of voxels 120 is arranged in the substrate 110. A voxel is a discrete volume of the substrate which has been modified to have a non-native birefringence. A voxel may be obtainable by focusing a high intensity laser beam, for example a femtosecond laser, on a location in the substrate 110. The laser causes a physical change to the structure of the substrate 110 at that location.

A voxel has a position which can be described by a set of coordinates x, y, z. A voxel may exhibit different refractive indices for light of different polarizations. A voxel may cause a change in the angle of polarization of the light. A voxel has a linear retardance. Linear retardance is a measure of the magnitude of the shift between orthogonal linear polarization components of light when the light interacts with the voxel.

The position, retardance, and change in the angle of polarization can be controlled by modulating the polarization, energy, timing, and/or number of pulses of laser light used to write the voxel. Any combination of these properties of the voxel can be used to encode digital data. For example, a given voxel may store 1 to 4 bits of binary data.

If the data include binary zeros, the zeros are encoded in voxels. In other words, any zeros are explicitly written into the storage medium, rather than being represented by the absence of a voxel. A group of voxels which stores an array of zeros is distinguishable from blank substrate material.

In the illustrated example, the voxels 120 are arranged as a stack of layers. The stack comprises a top layer 130, an intermediate layer 132, and a bottom layer 134. In the context of the methods discussed below, the "top" layer is the layer which is closest to the illumination objective of the measurement system, and the "bottom" layer is the layer which will be closest to the detection objective of the measurement system.

Voxels within a layer are separated from each other laterally. Voxels may be equally spaced, e.g. arranged in a rectangular grid. Other arrangements are possible, and spacings between voxels are not necessarily equal.

There are on average N voxels per unit area. The average lateral spacing between the voxels is referred to as the pitch, p. The pitch p is related to the average number of voxels per unit area N by p=sqrt(1/N). By way of illustration, the pitch may be less than or equal or 1 µm. The smaller the pitch, the greater the density of data which may be stored in the optical data storage medium, provided that the measurement system used remains capable of resolving individual voxels. The methods discussed hereinbelow may improve contrast, thereby allowing for the use of optical data storage media having smaller pitches.

Adjacent layers are spaced from each other by a distance Λ. By way of illustration, Λ may be in the range 5 to 20 µm. The layers of voxels may have a thickness t in the range 1 to 5 µm. The ratio of the thickness of each layer of voxels to the inter-layer spacing is referred to as the duty:

$$\text{Duty} = 100\frac{t}{\Lambda}$$

The duty is not particularly limited and may, for example, be in the range 15 to 25%, optionally about 20%.

The example optical data storage medium illustrated in FIG. 1 has three layers of voxels. In practice, the number of layers of voxels is not particularly limited. An optical data storage medium may include tens or hundreds of layers of voxels. For example, the optical data storage medium may include 50 or more layers of voxels.

The layers of voxels in the illustrated example are planar. Other geometries are possible.

FIG. 2 shows a plan view of the multi-layer optical data storage medium 100. As illustrated, that the voxels within a layer may be arranged in sectors 140*a* to 140*f*. A sector is a group of voxels, and may be a group of voxels which can be imaged simultaneously by an imaging system. In the illustrated example, each sector is a substantially planar 2D array of voxels, arranged on an xy plane. Sectors may be spaced from one another by blank regions of substrate. A blank region is a region which is free of voxels.

In the illustrated example, the sectors are rectangular arrays. Other shapes are possible. The optical data storage medium may include vertical stacks of sectors. A vertical stack of sectors is referred to herein as a "track".

FIG. 2 further illustrates a field of view 150 of a wide-field imaging system. A wide-field imaging system captures an image of a plurality of voxels in parallel, as opposed to reading one voxel at a time. For example, a field of view having an area of at least 100 µm$^2$, and optionally an area in the range 125 µm$^2$ to 4 mm$^2$, is considered "wide".

The field of view of the imaging system may cover an area which is greater than the area of a single sector. This allows a margin of error in the lateral positioning of the optical data storage medium relative to the imaging system since the sector may remain readable even if the sector is not centered in the field of view.

When reading the optical data storage medium, a track may be selected by moving the imaging system and/or storage medium to align the imaging system with the track. A sector within a track may be selected by varying the focus of the imaging system.

Tracks may be spaced from one another laterally by blank regions. The lateral spacing between tracks may be selected such that voxels of only one sector will appear in each image. It may be less computationally expensive to recover data from an image of a single sector, compared to an image which includes voxels from two or more sectors.

The illustrated optical data storage medium is transmissive. Reflective media are also contemplated. A reflective multi-layer optical data storage medium further comprises a reflective layer below the voxels.

Reading data from a storage medium 100 involves imaging the voxels 120 and processing the resulting image to determine birefringence properties (i.e., azimuth angle and/or retardance) of the voxels. The birefringence properties encode the data stored in the storage medium 100. The ability to recover the stored data is thus highly dependent upon the quality of the image.

It would be desirable to provide an improved imaging method. Improved imaging may allow for data to be stored at higher density, by reducing the need for error correction and thus allowing a smaller proportion of parity bits to be written to the storage medium. Improved imaging may extend the lifetime of the storage media and/or the hardware used to read the storage media. Improved imaging may allow lower-cost components, manufactured to looser tolerances, to be used to read and/or write the voxels.

A high-quality image has good contrast and an appropriate brightness.

Contrast is a measure of a difference in brightness (i.e., a difference in signal intensity). An image has an overall contrast, corresponding to the difference in brightness between the brightest pixel in the image and the darkest pixel in the image. An image of voxels also has a 'voxel contrast': the difference in brightness between voxels that encode different symbols. When reading data from a multi-layer optical data storage medium, it is particularly desirable to maximize voxel contrast.

An appropriate brightness is obtained when the intensity of light arriving at the detector is tuned to the detector's dynamic range. If the intensity is towards the detector's lower limit of detection, then the signal-to-noise ratio of the image will be poor. If the intensity is too high, then the detector will be oversaturated resulting in loss of information.

The quality of images captured by a measurement system such as a polarized light microscope is dependent upon the calibration of the system.

Measuring the birefringent properties of a voxel often involves collecting multiple images of the voxel using light in respective different input states. Light which is in an "input state" has a specific polarization, typically an elliptical polarization.

A method for determining birefringence based on measurements using two input states is disclosed in WO 2021/225706 A1. A method which makes use of three input states to determine birefringence of biological samples is disclosed in Shribak and Oldenbourg, Applied Optics, vol. 42, no. 16, pp. 3009-3017. Methods using four and five different input states have also been disclosed.

When using multiple images, it would be desirable for the intensities of the images (e.g., the total camera counts) to be balanced, such that all of the images have appropriate brightness and contrast. A set of two or more images is "balanced" when all of the images have adequate voxel contrast to allow the voxels to be resolved. Total camera count provides a proxy measurement. For example, a set of two or more images may be considered "balanced" when the total camera counts for the images are all within 10%, 5%, 2%, or 1% of one another. Balancing may be especially challenging when the images are collected simultaneously.

The quality of images captured by an optical measurement system, such as a polarized light microscope, is influenced by the calibration of the system.

The path from the light source to the detector may have a variable amount of attenuation. Variations in attenuation may arise from, for example, variation in component properties over time and/or variations in the mechanical alignment of components. Techniques for compensating for changes in attenuation include varying the power of the light source; varying the sensitivity of the detector; and providing mechanical alignment compensation.

Optical measurement systems are also subject to non-attenuating variations which degrade the contrast or signal-to-noise ratio of the images. Non-attenuating variations cannot be fully compensated for by varying the power of the light source and sensitivity of the detector.

The inventors have found that the data storage medium itself may contribute to non-attenuating variations. Macroscopic optical properties of the data storage medium may deviate from those of a blank substrate, especially if the data storage medium contains many layers of voxels. In the present context, "macroscopic" optical properties are the aggregate optical properties of a wide field of view through the data storage medium (e.g., the properties of a field of view having an area of at least 100 $\mu m^2$). The optical properties of an individual voxel may be referred to as "microscopic" optical properties.

Light scattering reduces image contrast. Scattering converts polarized light into unpolarized light. Some of this unpolarized light unavoidably arrives at the detector, resulting in undesirable polarization-insensitive background signal. The voxels in the medium may cause light scattering.

Optical components of the measurement system may introduce spurious birefringence or polarization. The effects of the optical components may be compensated for by calibrating the measurement system in air (in other words, in the absence of a data storage medium or other sample). If desired, calibration in air may be performed before practicing any of the methods provided herein.

Further, the data storage medium may have a background birefringence, which may negatively affect the signal-to-noise ratio of the measurement. Without wishing to be bound by theory, stress birefringence caused by the voxels is believed to contribute to the background birefringence.

Figure 3:
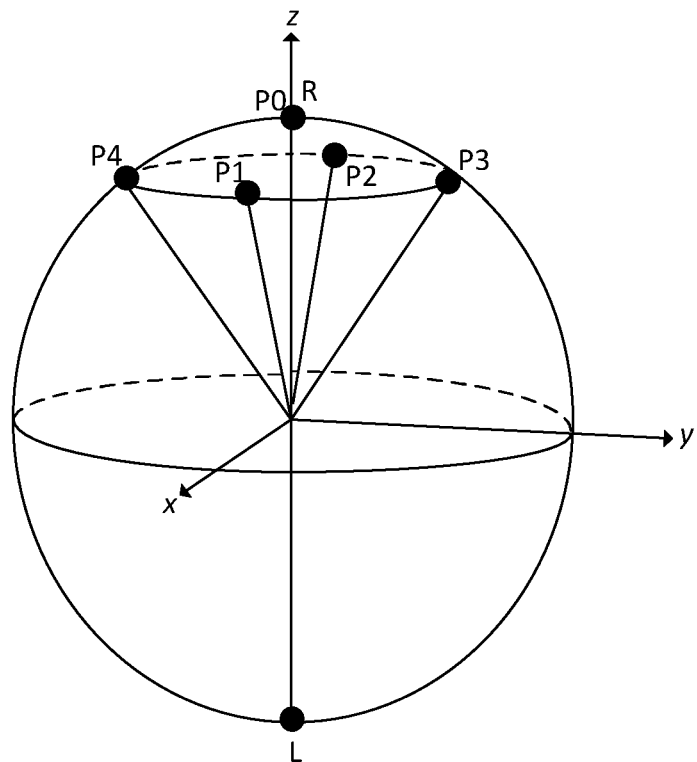
FIG. 3 is a Poincaré sphere representing five example input states in the absence of background birefringence.
Figure 4:
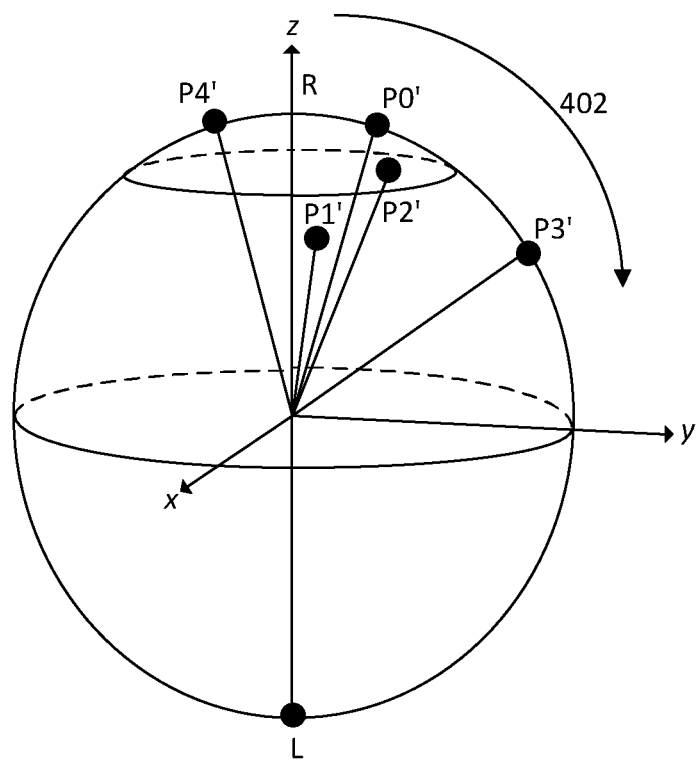
FIG. 4 is a Poincare sphere representing the input states of FIG. 3 after interaction with a background birefringence.

The effect of background birefringence will now be explained with reference to FIGS. 3 and 4. FIG. 3 is a Poincaré sphere representing five example input states before interacting with background birefringence. FIG. 4 is Poincaré sphere representing the input states after interacting with the background birefringence.

Voxels are read by detecting changes to the polarization of elliptically-polarized light. FIG. 3 illustrates Stoke vectors for a right-circularly-polarized input state P0, and four different elliptically-polarized input states P1, P2, P3, and P4.

When polarized light in an input state passes through a voxel, its polarization changes in a deterministic manner to yield transmitted light in an output state. The change in polarization can be represented as a rotation of the Stokes vector for the output state, compared to the input state.

When reading a voxel, the measurement is of the intensity of transmitted light which has a selected polarization. Light having this polarization is said to be in a detection state. In this example, the detection state is left-circularly-polarized light L.

As mentioned, the polarization change caused by a voxel is deterministic and the properties of the voxel are controlled when the voxel is written. Thus, in an idealized case optimal input state(s) and detection state(s) could be determined analytically in advance based on the retardance and azimuth values chosen when writing the voxels applying an assumption that no light scattering occurs. It has been found that, in reality, background birefringence shifts the observed azimuth and retardance and that light scattering causes the optimum swing angle for the input state(s) and detection state(s) to deviate from the idealized case.

FIG. 4 shows the effect of background birefringence on the input states shown in FIG. 3. The background birefringence, which has a retardance $\delta_{BG}$ and an azimuth $\theta_{BG}$, causes an unwanted rotation of the input states. This is visualized in FIG. 4 as a rotation of the Stokes vectors for the input states in direction 402.

The effect may be seen most clearly for input state P0. State P0 was originally right-circularly-polarized. FIG. 4 shows that state P0 has become elliptically polarized due to the background birefringence. This is illustrated by the rotation of input state P0's Stokes vector in direction 402. The Stokes vectors for input states P1, P2, P3, P4 have likewise all rotated in direction 402 due to the background birefringence.

Since the input states have shifted away from their original polarizations, the output states obtained following the interaction of the input states with the voxel also change. Consequently, the amount of light which is in the detection state, and hence receivable by the detector, will be different from the ideal case. This may change the brightness and/or contrast of the image. Contrast may be lost.

When using multiple detectors, signal which would have arrived at a target detector in the absence of background birefringence may instead arrive at a different detector.

Provided herein is a method of calibrating a measurement system (e.g., a polarized light microscope) for reading birefringent optical data storage media. An example implementation of the method will now be explained with reference to the flow diagram shown in FIG. 5.

Figure 7:
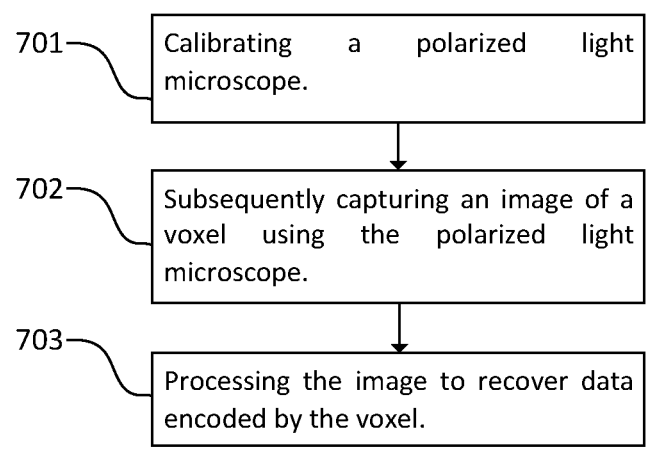
FIG. 7 is a flow diagram outlining an example method of reading data from a birefringent optical data storage medium.

At block 501, a birefringent optical data storage medium of the type described with reference to FIGS. 1 and 2 is placed in the sample stage of the polarized light microscope. The polarized light microscope may be a system as discussed below with reference to FIGS. 7 and 8. The polarized light microscope may configured as or integrated into a read head of a system for reading optical data storage media.

The birefringent optical data storage medium is positioned such that light from the light source of the polarized light microscope will pass through voxels of the birefringent optical data storage medium.

In implementations where the birefringent optical data storage medium includes a plurality of layers of voxels, the light traverses through all of the layers. The read system calibration may then benefit from incorporating the macroscopic effects resulting from the propagation through the whole stack of layers.

In comparative methods, a blank substrate is used for calibration or, alternatively, the system is focused on a blank region of a data storage medium such that the light used for calibration does not pass through any voxels. The inventors have found that the use of a blank substrate or blank region for calibration fails to account for the effect of the voxels on macroscopic optical properties.

At block 502, a background birefringence of the optical data storage medium is measured.

Measuring the background birefringence includes focusing the polarized light microscope on a selected layer of voxels. In implementations where the optical data storage medium includes a plurality of layers of voxels, the polarized light microscope may be focused on an intermediate layer 132. Light from the light source passes through a number of preceding layers of out-of-focus voxels before reaching the chosen layer, and a number of subsequent layers after reaching the chosen layers, before arriving at the detector.

The polarized light microscope may in particular be focused on a middle layer of voxels. If a middle layer is chosen, the number of preceding layers and the number of subsequent layers is equal (if the stack has an odd number of layers) or differ by exactly one (if the stack has an even number of layers).

Selecting an intermediate layer which is at or close to the middle of the stack may have the effect of averaging contributions to background birefringence from the preceding layers and subsequent layers. This may allow for a better background correction.

The polarized light microscope has a field of view 150 as illustrated in FIG. 1. When measuring the background birefringence, a wide field of view may be used such that the field of view encompasses a plurality of voxels in the selected layer.

By measuring background birefringence across a field of view that encompasses multiple voxels, the effects of individual voxels are averaged out. The voxels in a data storage medium encode arbitrary data, and thus voxels encoding different symbols are in effect arranged pseudo-randomly.

The field of view 150 may have an area selected to encompass at least 10 voxels, optionally at least 100 voxels, further optionally at least 1000 voxels of the selected layer. By way of illustration, the field of view of the polarized light microscope may have an area of at least 100 $\mu m^2$.

The incident light which is used to measure the background birefringence comprises polarized light in one or more different input states. The number of input states may be at least three, optionally at least four, further optionally at least five.

Background birefringence, i.e. the background retardance and azimuth, may be measured with a polarization state analyzer using polarimetric methods.

In implementations where multiple input states are used, measuring the background birefringence may comprise measuring a respective intensity of light in a detection state received at a detector; and based on differences between the measured intensities, calculating the background birefringence. As an alternative to varying the input state, the detection state may be varied.

Where multiple input states are used, the data storage medium is illuminated with the input states sequentially. The multiple input states may be generated by a variable polarization state generator.

In implementations where a single input state is used, the polarized light microscope may include a plurality of detectors, each detector configured to detect light in a respective different detection state. This may allow light in the plural different detection states to be detected simultaneously. Alternatively, a single detector may be used with a variable polarization state analyzer, and different detection states may be investigated sequentially.

After measuring the background birefringence, an optical component of the polarized light microscope is adjusted to compensate for the background birefringence at block 503. In other words, the input state(s) and/or detection state(s) of the polarized light microscope are tuned to counteract the effects of the background birefringence.

Adjusting the optical component may comprise modifying the polarization of an input state. Modifying the polarization of an input state may be referred to as "pre-compensation".

As was explained with reference to FIGS. 3 and 4, background birefringence shifts the polarization of incident light. Pre-compensation comprises applying a correction to the input state to counteract the effect of the background birefringence.

In other words, the correction shifts the Stokes vectors of the input state in a direction opposite to the perturbance 402 illustrated in FIG. 4. Then, the background birefringence shifts the input state back towards the desired state for reading the voxels.

The direction and magnitude of the correction may be selected to compensate for the effects of the background birefringence on both the input state and the output state generated after the input state interacts with the voxels.

The optical component which is adjusted when performing pre-compensation may comprise a polarization state generator. Any other component capable of modifying the input state may alternatively or additionally be used. Components which are capable of modifying polarization states may be referred to generally as "compensation optics".

Adjusting the optical component may comprise modifying the detection state. Modifying the detection state may be referred to as "post-compensation".

The output state generated as polarized light passes through a voxel will be shifted away from the expected output state by the background birefringence. Post-compensation corrects for this shift by changing the detection state to correspond more closely to the shifted output state.

The optical component which is adjusted when performing post-compensation may be a polarization state analyzer. Alternative or additional compensation optics may be used.

The adjustment may comprise adjusting two or more optical components of the polarized light microscope. In some implementations, both pre-compensation and post-compensation may be performed together.

In implementations where the measurement system includes a single illumination arm and multiple detection arms, the use of pre-compensation alone may reduce hardware complexity. Compensation optics may be provided in the illumination arm alone, as opposed to providing compensation optics in each of the multiple detection arms.

Likewise, if the measurement system has a single detection arm, then the use of post-compensation alone may be advantageous.

The method may further comprise, at block 504, capturing an image of a voxel and determining whether the image satisfies one or more constraints. The operations of block 504 are optional: after block 503, the method may terminate or may proceed directly to block 505.

The one or more constraints may comprise a predetermined minimum level of contrast.

Determining whether the image satisfies the one or more constraints may comprise determining whether pixels in the image have brightnesses falling within a predetermined range.

A group of multiple images may be captured using respective different input states or output states. In such implementations, block 504 may comprise determining whether the group of multiple images satisfies one or more constraints. The one or more constraints may comprise a constraint on a difference in overall measured intensity between images.

In response to determining that one or more constraints are not met, a further round of calibration may be performed by repeating the operations of blocks 503 and 504.

In response to determining that the one or more constraints are met, the method may either terminate or proceed to optional block 505.

At block 505, an optical component of the polarized light microscope is adjusted to optimize a measurement state to compensate for light scattering. The measurement state may be an input state or a detection state.

In implementations where more than one different input state is used, a respective adjustment may be applied to each of the different input states. In implementations where more than one different detection state is used, a respective adjustment may be applied to each of the different detection states.

Optimizing the measurement state may comprise optimizing a swing angle $\chi$ of the measurement state. Optimizing the swing angle comprises selecting a swing value to maximize measurement sensitivity. Sensitivity is maximized when contrast within an image is greatest.

Figure 6:
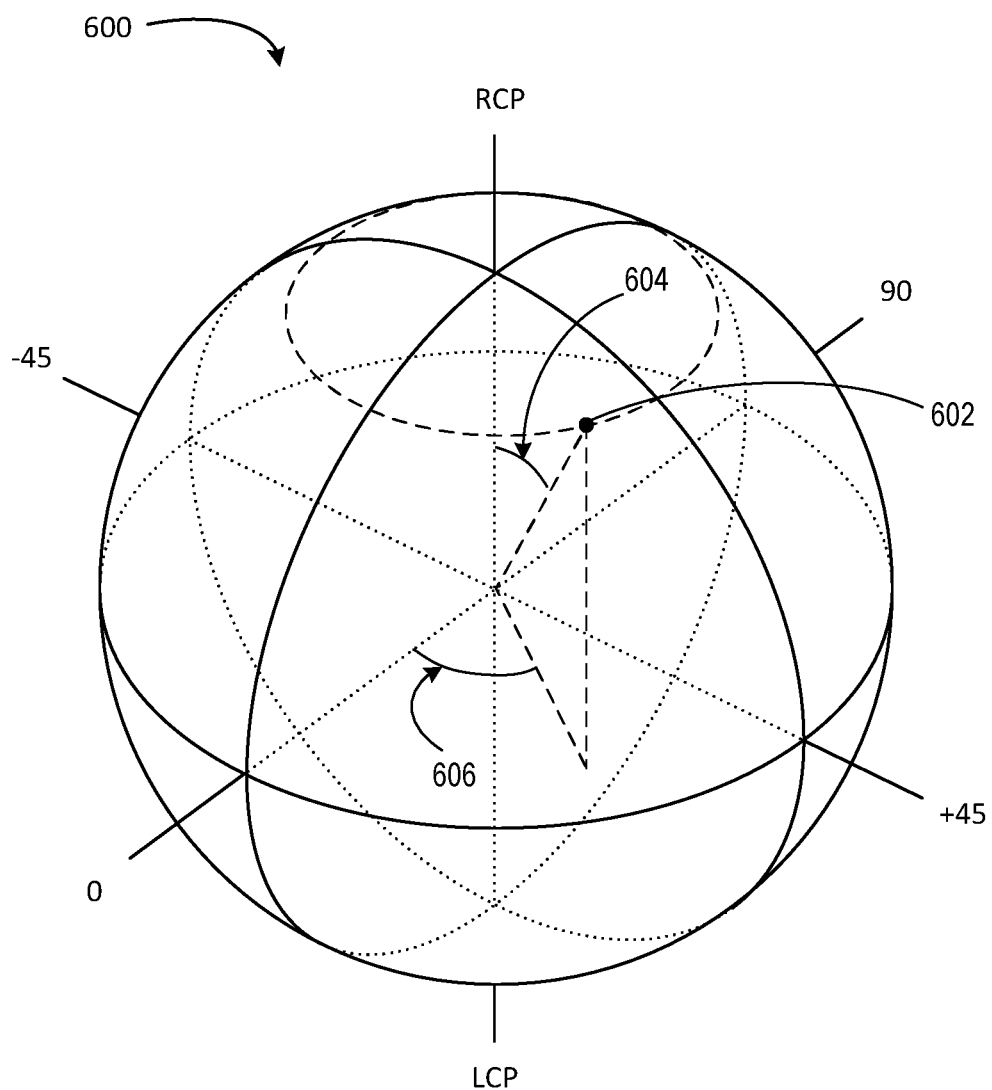
FIG. 6 is a Poincaré sphere representing an input state and annotated to illustrate what is meant by "swing"

To illustrate what is meant by "swing angle", an annotated Poincaré sphere 600 is shown in FIG. 6.

A Poincare sphere represents the polarization states of light by mapping the last three components of the 4D Stokes vector onto a 3D cartesian coordinate system.

For fully polarized light, a particular measurement state is described by a particular position on the surface of the sphere representing a particular polarization state of light. Partially polarized light is represented by points inside from the surface of the Poincare sphere.

The north pole represents right circularly polarized light, RCP. The south pole represents left circularly polarized light, LCP. The states on the equator are linear polarizations with angle defined by the azimuthal angle on the sphere.

A general point on the sphere is elliptically polarized with ellipticity determined by the angle between the state and the pole, and azimuth defined by the angle around the sphere.

An example polarization state is shown at 602 on the sphere. The dashed curved line is a circle of constant latitude, corresponding to polarization states with the same degree of ellipticity.

Swing $\chi$ refers to the angle 604 of the measurement state relative to the pole of the sphere. The horizontal angle is the azimuth 606.

After light in an input state passes through a voxel, the intensity l of the signal received at the detector is given by:

$$I = 1 - \cos \chi \cos \delta - \sin \chi \sin \delta \sin(2(\theta - v)) + I_{min}$$

where $\chi$ and $v$ respectively give the polar and longitude angle of the swing state, $\delta$ and $\theta$ are the voxel retardance and azimuth respectively and $I_{min}$ is a depolarized component. In high quality polarization microscopes the degree of polarization of light generated by the microscope approaches unity and the depolarized component is dominated by scattering-induced depolarized light from the sample.

Contrast C is defined as:

$$C = \frac{\max(I) - \min(I)}{\max(I) + \min(I)}$$

The maximum relative intensity is given by the expression:

$$\max(I) = 1 - \cos \chi \cos \delta + \sin \chi \sin \delta + I_{min}$$

The minimum relative intensity is:

$$\min(I) = 1 - \cos\chi\cos\delta - \sin\chi\sin\delta + I_{min}$$

Substituting these definitions into the equation for C and simplifying gives:

$$C = \frac{\sin\chi\sin\delta}{1 - \cos\chi\cos\delta + I_{min}}$$

To find the maximum contrast C, we take the derivative:

$$\frac{\partial C}{\partial \chi} = \frac{\sin\delta(\cos\chi(1 + I_{min}) - \cos\delta)}{(1 - \cos\chi\cos\delta + I_{min})^2}$$

and then solve for $$\frac{\partial c}{\partial \chi} = 0,$$

giving the result:

$$\chi = \arccos\left(\frac{\cos\delta}{1 + I_{min}}\right)$$

which represents the swing value co-optimized for the value of voxel retardance $\delta$ and the amount of depolarized light $1_{min}$ induced by scattering. Voxels have very weak retardance. This expression can therefore be simplified using the small angle approximation (cos $\delta$~1), leading to:

$$\chi \approx \arccos\left(\frac{1}{1 + I_{min}}\right) = \arccos(DOP)$$

where DOP denotes the degree of polarization of the measured signal. The DOP may be determined by polarimetry, or any other suitable technique.

The optimal swing value for the measurement state is thus given by the arccosine of the degree of polarization (DOP).

Optimizing the swing angle of the measurement state in this manner may be particularly useful when the data storage medium includes many layer of voxels, for example, 50 or more layers. Scattering becomes increasingly significant as the number of layers of voxels increases.

The above derivation was explained with reference to an input state as an example. It will be appreciated that by symmetry the same result is arrived at if a detection state is considered instead. The optimal swing angle for the detection state is the arccosine of the degree of polarization.

Optimizing the measurement state may thus comprise determining the degree of polarization of light transmitted through the optical data storage medium, and adjusting an optical component of the optical light microscope to set the swing angle of the measurement state equal to the arccosine of the degree of polarization. When the measurement state is an input state, the optical component which is adjusted may be a polarization state generator. When the measurement state is a detection state, the optical component which is adjusted may be a polarization state analyzer.

The above example discusses a single measurement state. As will be appreciated, imaging voxels often involves the use a plurality of measurement states. The optimization may be applied to a plurality of measurement states.

For example, a plurality of input states may be used. The swing angle of each input state of the plurality of input states may be set to the arccosine of the DOP. The plurality of input states may for example comprise two to five different input states.

A plurality of detection states may be used. In such implementations, the swing angle of each detection state of the plurality of detection states may be set to the arccosine of the DOP. The plurality of detection states may for example comprise two to five different detection states.

A plurality of input states may be used in conjunction with a single detection state. Alternatively, a single input state may be used in conjunction with a plurality of detection states. A still further possibility is to use a plurality of input states and a plurality of detection states.

The optimization may be applied to the input state(s) only or to the detection state(s) only. A still further possibility is to apply the optimization to the input state(s) and to the detection state(s).

If the optimization of the swing angle of the measurement state were to be attempted without first correcting for the background birefringence, then contrast over a set of images may decrease (in other words, images may become less balanced) rather than increase. In a worst case, one of the images may become contrast-less.

Figure 5:
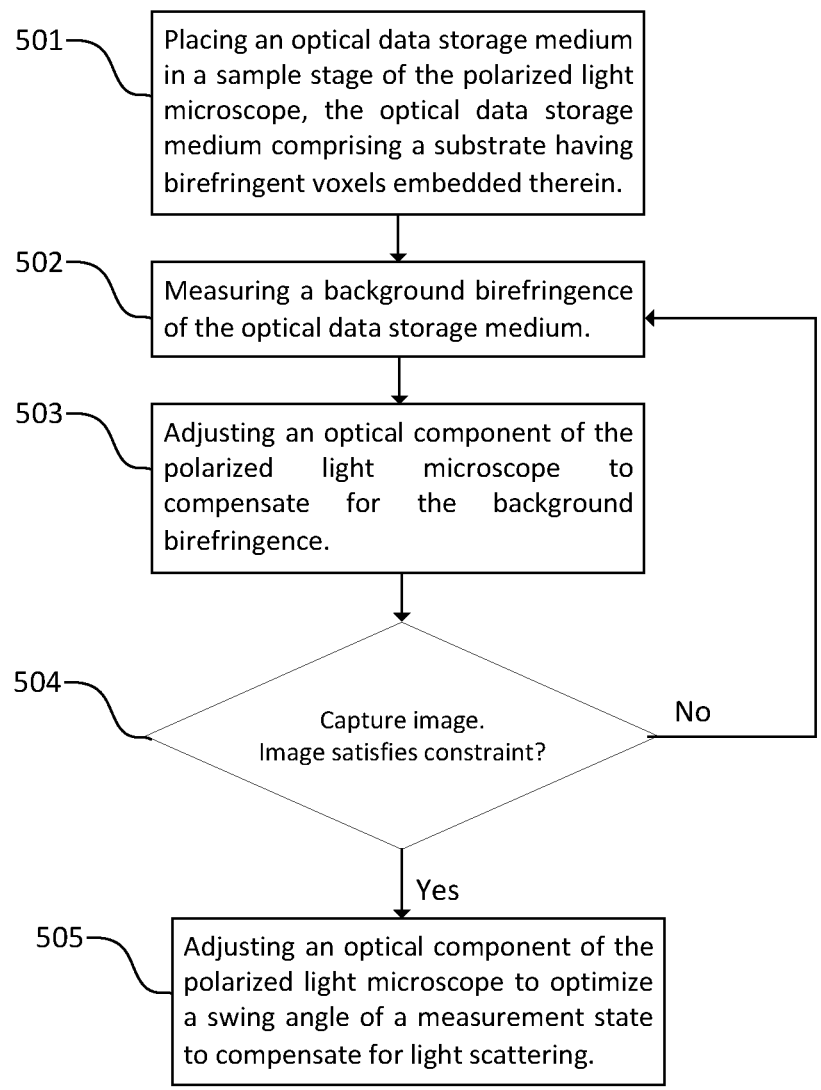
FIG. 5 is a flow diagram outlining an example method of calibrating a polarized light microscope.

The calibration method discussed with reference to FIG. 5 is useful in the context of a method of reading data from a birefringent optical data storage medium. An example method of reading data will now be described with reference to FIG. 7, which is a flow diagram outlining the method.

At block 701, a polarized light microscope is calibrated in accordance with the method of FIG. 5.

Subsequently, at block 702, an image of a voxel is captured using the polarized light microscope.

This operation may comprise capturing a plurality of images of the voxel, using light in respective different input states. For example, two, three, four, five or more images of the voxel may be captured.

Typically, images of a plurality of voxels are captured. For example, images of one or more sectors 140 as illustrated in FIG. 2 may be captured. Voxels may be imaged in groups using a wide-field detector, or may be imaged one at a time using a point detector.

Then, at block 703, the image(s) are processed to recover data encoded by the voxel(s). Various computer vision techniques may be used to process the image(s) to recover stored binary data.

Processing the images may include making use of supplementary data, such as predetermined scale and offset values as discussed for example in WO 2021/225706 A1. The use of supplementary data may allow for the use of fewer different input states.

Recovering the data may include performing error checking and/or making use of parity data to recover unreadable portions of the data.

When reading data from two or more data storage media, calibration operation 701 may be repeated as appropriate. For example, the polarized light microscope may be recalibrated after a predetermined time interval.

Calibration may be repeated on a second data storage medium if the second data storage media is dissimilar from a first optical data storage medium used for the initial calibration. The first and second data storage media may be dissimilar in terms of age, substrate material, the method used to write the voxels, etc.

The improvements in measurement accuracy achievable by the calibration method as described herein may allow for more reliable recovery of data from data storage media.

A comparative method compensates for the effects of background birefringence computationally.

More specifically, the comparative method corrects for background retardance by subtraction of auxiliary images. This approach requires auxiliary images to be captured while the data-carrying birefringent voxels are outside of the field of view of the detector.

Capturing the auxiliary images, in other words performing additional sampling of the optical data storage medium, constrains the maximum rate at which data can be read from the medium. The methods provided herein may avoid the need to capture auxiliary images, and may thus allow improved data throughput.

Further, the comparative method is not capable of compensating for background birefringence caused by the presence of layers of voxels in the medium. The inventors have found that the effects of the voxels are significant, especially when many layers of voxels are present.

Figure 8:
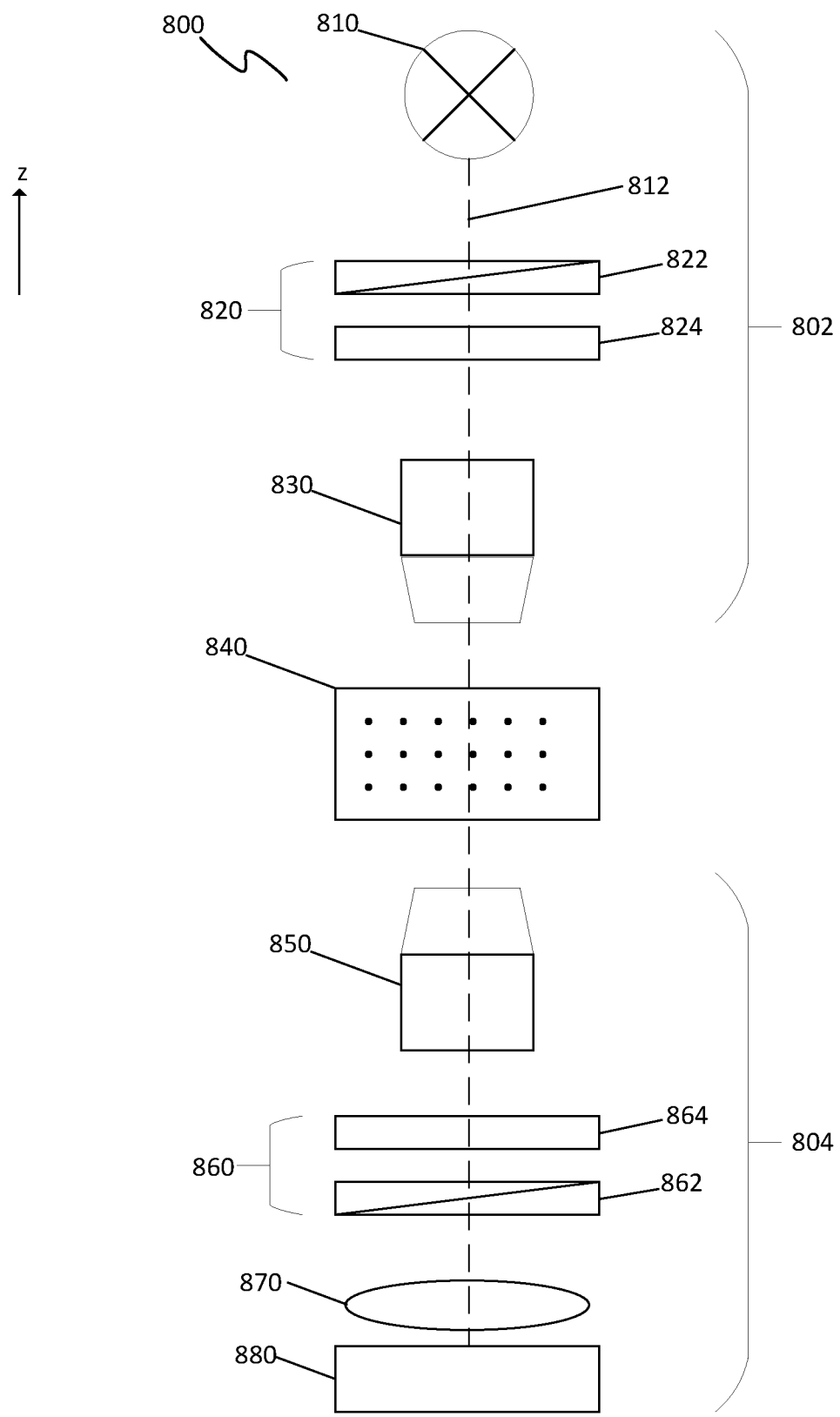
FIG. 8 is a block diagram showing optical components of an example system for reading data from a birefringent optical data storage medium.
Figure 9:
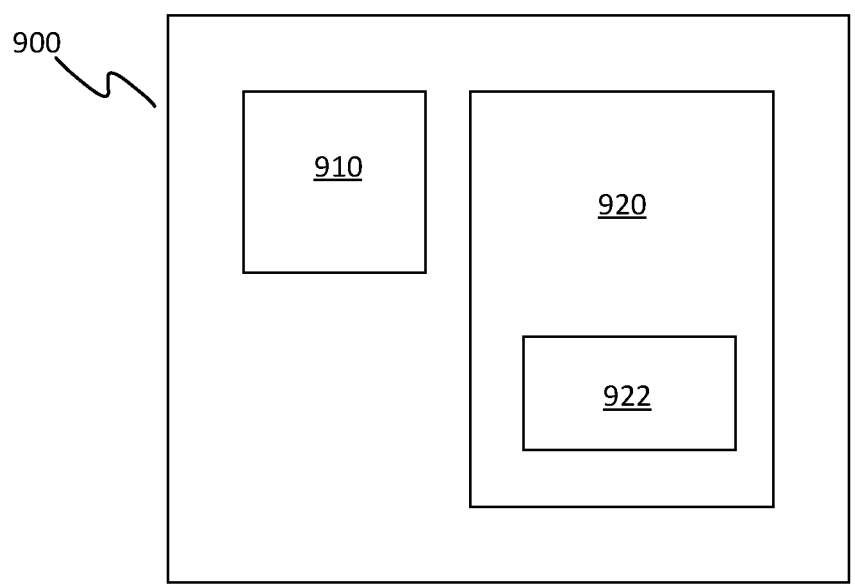
FIG. 9 is a block diagram of a controller for controlling the system of FIG. 8.

An example system for reading data from a birefringent optical data storage medium will now be described with reference to FIGS. 8 and 9. FIG. 8 is a schematic block diagram of the optical components of the system. FIG. 9 is a schematic block diagram of a controller useful for controlling operation of the optical components.

The system 800 includes, in sequence, a light source 810; a polarization state generator ("PSG") 820; a condenser 830; a sample stage, which in this example is occupied by a birefringent optical data storage medium 840; a detection objective 850; a polarization state analyzer ("PSA") 860; a lens 870; and a detector 880.

The components which are upstream of the sample stage on light path 812, i.e. the light source 810, PSG 820, and condenser 830, may be referred to collectively as illumination arm 802. The components which are downstream of the sample stage, i.e. the detection objective 850, PSA 860, lens 870 and detector 880 may be referred to collectively as detection arm 704.

Light source 810 is configured to emit light along the light path 812. The nature of the light source 810 is not particularly limited. The light source may generate unpolarized light. The light source may be, for example, an LED light source or a laser light source.

The polarization state generator 820 is arranged on the light path 812. The PSG 820 is configured receive light from the light source 810 and to provide polarized light in one or more input states.

In the illustrated example, the PSG 820 comprises a linear polarizer 822 and a quarter-wave plate 824 arranged in series.

The PSG 820 may be configured to allow the input state to be varied, for example when performing pre-compensation as described with reference to block 503 of FIG. 5. For example, the linear polarizer 822 and quarter wave plate 824 may be configured to be rotated relative to one another. To this end, one or both of the linear polarizer 822 and quarter wave plate 824 may be mounted on a rotation mount.

The polarization state generator may alternatively comprise a liquid crystal variable retarder. The polarization states generated by a liquid crystal variable retarder may be varied by applying an electrical signal to the liquid crystal.

Condenser 830 is arranged on the light path 812, downstream of the polarization state generator 820. The condenser 830 is configured to focus polarized light received from the polarization state generator onto the optical data storage medium 840 to provide homogeneous illumination within a field of view of the detector.

The system further includes a sample stage configured to hold optical data storage medium 840 in the light path 812, downstream of the illumination objective 830. Any suitable supporting structure may be used. The sample stage may be configured to allow the optical data storage medium 840 to be moved relative to the detection objective 850.

The sample stage may be configured to move the optical data storage medium in the z direction to allow different layers of voxels to be brought into focus.

A detection objective 850 is arranged on the light path 813, downstream of the sample stage. The detection objective receives light which has passed through the data storage medium 840, and focusses the light onto polarization state analyzer 860.

The polarization state analyzer 860 of this example is similar in structure to the polarization state generator 820, and comprises a quarter wave plate 862 and a linear polarizer 864 arranged in series. The polarization state analyzer 860 receives light which has passed through the data storage medium 840. The polarization state analyzer 860 selectively transmits light which is in a specific polarization state, referred to herein as a detection state, to detector 880 via lens 870.

The polarization state analyzer 860 may be configured to allow the detection state to be varied. For example, the quarter wave plate 862 and a linear polarizer 864 may be mounted such that the quarter wave plate 862 and a linear polarizer 864 are rotatable with respect to one another.

Alternative polarization state analyzers may be used. For example, the polarization state analyzer may comprise a liquid crystal variable retarder.

The system 800 further comprises a detector 880 and a lens 870. Lens 870 receives light in the detection state from the polarization state analyzer and focusses the light onto the detector 880.

Detector 880 may comprise for example, a CMOS image sensor or other suitable photodetector array that can image an entirety of the field of view on a focal plane positioned within the optical data storage medium, and thereby image a plurality of arrayed voxels in a same image. Alternatively, detector 880 may be a point detector which may be used to build up an image point-by-point. Examples of point detectors include a photodiode, a phototransistor, and single photon avalanche diode ("SPAD").

Various modifications may be made to the optical components of the example system.

The example system includes both a PSG and PSA, and is therefore configured to allow for both pre- and post-compensation. One of the PSG and PSA may be replaced by a fixed polarizing filter to provide a system configured to allow either pre- or post-compensation.

The example system may be modified to include additional optical components, for example to modify the light path.

Detection objective 850 and/or lens 870 may be omitted in some implementations.

The system illustrated in FIG. 8 includes one detector 880 and one polarization state analyzer 860. Variants of the system may include a plurality of detectors. For example, two to five detectors may be present.

In such variants, the system may further comprise a beam splitter configured to separate light received from the detection objective 850 into a plurality of beams, and to direct each beam to a respective detector. Each detector may be associated with a respective PSA or polarizing filter. The PSAs or polarizing filters may be configured to transmit light in respective different detection states to the associated detector.

Some techniques for recovering data from a voxel make use of a plurality of images (e.g., two to five images) of the voxel measured using different detection states. Providing a system having a corresponding plurality of detectors may allow the images to be obtained in parallel, thereby increasing throughput.

Systems which include a plurality of detectors may make use of pre-compensation, with the adjustments to the polarization states taking place in the illumination arm 802. This may reduce the hardware costs for the detection arm 804, since each detector may be associated with a fixed polarizing filter rather than a variable PSA.

As an alternative or in addition to providing multiple detectors, the illumination arm 702 may include a plurality of PSGs for providing respective input states. Each PSG may be associated with a respective different light source, or a single light source may provide light to multiple PSGs through the use of one or more beam splitters.

The system 800 further comprises a controller for controlling operation of various ones of the optical components to perform a method as described herein. A block diagram of an example controller 900 is provided in FIG. 9.

The controller 900 comprises a processing apparatus 910 and data storage 920.

The processing apparatus 910 includes one or more processing units implemented in one or more dies, IC (integrated circuit) packages and/or housings at one or more geographic sites.

Each of the one or more processing units may take any suitable form, e.g. a general-purpose central processing unit (CPU), or a dedicated form of co-processor or accelerator processor such as a graphics processing unit (GPU), digital signal processor (DSP), etc. Each of the one or more processing units may comprise one or more cores.

The processing units may include one or more analogue processing units in addition to one or more digital processing units. The one or more analogue processing units may be configured to perform analogue signal processing, for example electronic filtering or signal conditioning. Analogue processing units may be useful for processing signals from the autofocus system.

Where it is said that a computer program is executed on the processing apparatus, this may mean execution by any one or more processing units making up the processing apparatus 910.

The processing apparatus 910 may further comprises working memory, such as random-access memory and/or one or more memory caches within the one or more processing units.

The data storage 920 comprises one or more memory units implemented in one or more memory media in one or more housings at one or more geographic sites. The data storage 920 stores computer executable instructions 922 which, when executed by the processing apparatus 910, cause the system to perform operations, for example to perform a method as described with reference to FIG. 5 or FIG. 7.

Data storage 920 may further store a representation of one or more properties of an optical data storage medium to be read using the system. Storing such properties may allow data to be read from a voxel using fewer measurements, as described in WO 2021/225706 A1.

Each of the one or more memory units may employ any suitable storage medium known in the art, e.g. a magnetic storage medium such as a hard disk drive, magnetic tape drive etc.; or an electronic storage medium such as a solid-state drive, flash memory or electrically erasable programmable read-only memory, etc.

The controller 900 is operably connected to optical components of system 800, in particular the detector 980 and at least one of PSG 820 and PSA 860.

Example

The polarization state analyzer of a measurement system as illustrated in FIG. 8 was initially calibrated in air to detect left circular polarization. The polarization state analyzer comprised a fixed waveplate, and a linear polarizer in a rotation mount such that the linear polarizer could be rotated to allow detection to be changed to arbitrary states.

To detect left circular polarization, the linear polarizer and quarter-wave plate were set such that:

$$\theta_{LP} = \theta_{QWP} - \frac{\pi}{4}$$

where $\theta_{LP}$ is angle of linear polarizer transmission axis and $\theta_{QWP}$ is angle of the quarter-wave plate's fast axis.

The measurement system included a wide-field detector, for imaging a plurality of voxels simultaneously. In this example, the measurement system more specifically had a square field of view with sides of length 170 µm.

A birefringent optical data storage medium as illustrated in FIGS. 1 and 2 was placed in the measurement system. The substrate of the optical data storage medium was a glass substrate.

The intensities of five different input polarization states after passing through a region of interest of the optical data storage medium and then the polarization state analyzer were measured.

Input polarization state 0 was right-circularly-polarized light. Input polarization states 1 to 4 were various different elliptical polarization states. The input states had equal intensities.

The results of the measurement are shown in Table 1.

TABLE 1 measured intensities for various input states
before applying background correction

| Input Polarization State | Intensity/camera counts |
| --- | --- |
| 0 | 10745 |
| 1 | 11053 |
| 2 | 56146 |
| 3 | 25666 |
| 4 | 41410 |

A significant signal was received when using input polarization state 0. The intensity of right-circularly-polarized light arriving at a polarization state analyzer set to allow detection of left-circularly-polarized light would ideally be 0. Further, the intensities of the signals received for input states 1 to 4 varied significantly. For example, measurement of state 2 yielded an intensity which was about 5 times that of state 1. Table 1 thus shows that the measurement system was not calibrated.

The measured intensities were used to calculate the background retardance $\delta_{BG}$ and azimuth $\theta_{BG}$ using the algorithm described by Shribak and Oldenbourg (Appl. Opt. 42, 3009-3017). The region sampled was determined to have a background retardance of 29 nm and an azimuth of 145°.

The detection state was adjusted based on the background retardance. In this example, the polarization state analyzer was adjusted such that the detection state was at the antipode of perturbed input state 0 on the Poincare sphere. More concretely, the linear polarizer and quarter-wave plate were adjusted such that:

$$\theta_{QWP} = \theta_{BG} \pm \frac{\pi}{4}$$

and $$\theta_{LP} = \theta_{QWP} - \frac{\pi}{4} \mp \frac{\delta_{BG}}{2}$$

If using instead a PSA with liquid crystal variable retarders, voltages would have been set to allow detection of an elliptical state with latitude angle of $-\pi+\delta_{BG}$ and longitude of $-\pi/2+2\theta_{BG}$.

The intensity measurement was repeated using the adjusted detection state, and the results are listed in Table 2.

TABLE 2 measured intensities for various input states after applying background correction

| Polarization State | Intensity/camera counts |
| --- | --- |
| 0 | 3582 |
| 1 | 26523 |
| 2 | 27026 |
| 3 | 27372 |
| 4 | 25876 |

The measured intensity for input state 0 was substantially reduced, and thus closer to the ideal case. Signal strengths for states 1 to 4 varied by at most 2% following the adjustment.

It is expected that by calculating a residual background birefringence based on the intensity values measured after one round of optimization, the balancing of signals between detectors could be improved even further.

It will be appreciated that the above embodiments have been described by way of example only.

More generally, according to one aspect disclosed herein, there is provided a method of calibrating a polarized light microscope. The method comprises placing an optical data storage medium in a sample stage of the polarized light microscope, the optical data storage medium comprising a substrate having birefringent voxels embedded therein; measuring a background birefringence of the optical data storage medium; and adjusting the polarized light microscope to compensate for the background birefringence. The background birefringence is measured using the polarized light microscope. It has been found that the presence of an optical data storage medium introduces a background birefringence. By compensating for the background birefringence, the capture of images with improved contrast may be made possible.

The method may further comprise subsequently measuring a residual background birefringence of the optical data storage medium and adjusting the polarized light microscope to compensate for the residual birefringence. Repeating the calibration in this way may allow for more effective compensation for the background birefringence.

The method may further comprise, after adjusting the polarized light microscope to compensate for the background birefringence, optimizing a swing angle, $\chi$, of a measurement state of the polarized light microscope to compensate for light scattering. It has been found that optimizing the swing angle after compensating for the background birefringence allows improvements in voxel contrast.

The optimization may be applied to a plurality of measurement states. The respective swing angles of a plurality of input states may be optimized. Alternatively or additionally, the respective swing angles of a plurality of detection states may be optimized.

Adjusting the swing angle $\chi$ of a measurement state may comprise determining a degree of polarization of light transmitted through a voxel of the optical data storage medium; and adjusting the polarized light microscope such that the swing angle of the measurement state is equal to the arccosine of the degree of polarization.

Adjusting the polarized light microscope to compensate for the background birefringence may comprise performing pre-compensation. Pre-compensation comprises adjusting the polarized light microscope to tune an input state generated by the polarized light microscope so as to counterbalance a shift in polarization of the input state caused by the background birefringence. The pre-compensation may comprise adjusting a polarization state generator of the polarized light microscope.

Adjusting the polarized light microscope to compensate for the background birefringence may comprise performing post compensation, wherein post-compensation comprises adjusting the polarized light microscope to tune a detection state of the polarized microscope so as to counterbalance a shift in polarization of the input state caused by the background birefringence. The post-compensation may comprise adjusting a polarization state analyzer of the polarized light microscope.

The background birefringence may be measured across a field of view of the polarized light microscope, the field of view encompassing a plurality of voxels. In this way, the effects of individual voxels may be averaged out.

Determining the background birefringence may comprise illuminating a field of view in the optical data storage medium with light in an input state; measuring a respective intensity of light in two or more different detection states after transmission of light in the input state through the optical data storage medium; and based on differences in the respective intensities, calculating the background birefringence using a data processor. Adjusting the polarized light microscope to compensate for the background birefringence may comprise modifying the two or more different detection states and/or the input state to balance the respective measured intensities.

Alternatively, measuring the background birefringence may comprise illuminating a field of view in the optical data storage medium with light in two or more different input states; for the two or more different input states, measuring a respective intensity of light in a detection state transmitted through the optical data storage medium; and based on differences in the respective intensities, calculating the background birefringence using a data processor. Adjusting the polarized light microscope to compensate for the background birefringence may comprise modifying the two or more different input states and/or the detection state to balance the respective measured intensities.

The birefringent voxels may be arranged in a stack of layers, the stack comprising a top layer, an intermediate layer, and a bottom layer. The polarized light microscope may be focused on the intermediate layer during the measurement of the background birefringence. The stack may include at least 50 layers of birefringent voxels. Focusing on the middle layer of voxels may allow for more effective correction of the background birefringence, by averaging the effects of the layers of voxels above and below the selected layer.

In another aspect, there is provided a method of reading data from a birefringent optical data storage medium. The method comprises positioning the birefringent optical data storage medium in a sample stage of a polarized light microscope, wherein the birefringent optical data storage medium comprises a substrate having birefringent voxels embedded therein. Then, with the birefringent optical data storage medium in a light path of the polarized light microscope, the polarized light microscope is calibrated by measuring a background birefringence of the optical data storage medium, wherein a voxel is in a light path of the polarized light microscope during the measurement; and adjusting the polarized light microscope to compensate for the background birefringence. After calibrating the polarized light microscope, the polarized light microscope is subsequently used to capture an image of a voxel using elliptically-polarized light. The image then processed using a processor to recover the data. Applying the calibration method provided herein may allow for images with improved contrast to be obtained. This may allow for more reliable data recovery.

As will be appreciated, calibrating the polarized light microscope may comprise carrying out the method described with reference to the preceding aspect.

For example, calibrating the polarized light microscope may further comprise, after adjusting the polarized light microscope to compensate for the background birefringence, optimizing a swing angle, $\chi$, of a measurement state of the polarized light microscope.

Optimizing the swing angle may comprise determining a degree of polarization of light transmitted through a voxel of the optical data storage medium; and adjusting the polarized light microscope such that the swing angle of the measurement state is equal to the arccosine of the degree of polarization. The measurement state may be a detection state. The measurement state may be an input state.

The optical data storage medium may have a plurality of layers of birefringent voxels. The plurality of layers may be on the light path during the measurement of the background birefringence. The effects of light scattering and background birefringence may be more pronounced when multiple layers of voxels are present.

Calibrating the polarized light microscope may further comprise, after adjusting the polarized light microscope to compensate for the background birefringence, measuring a residual background birefringence, wherein a voxel is in a light path of the polarized light microscope during the measurement; and further adjusting the polarized light microscope to compensate for the residual background birefringence.

Capturing the image may comprise capturing a plurality of images using light in a plurality of respective different measurement states. Images may be captured using respective different input states. Images may be captured using respective different detection states.

Still another aspect provides a system for reading data from a birefringent optical data storage medium. The system comprises a light source for emitting light along a light path; a polarization state generator on the light path, the polarization state generator being configured to receive light from the light source and to output circularly- or elliptically-polarized light in an input state; a sample stage, wherein the sample stage is configured to hold an optical data storage medium on the light path, downstream of the polarization stage generator; a polarization state analyzer on the light path downstream of the sample stage; a light detector for detecting light in a detection state, the light detector being on the light path downstream of the polarization state analyzer; and a controller comprising a processor and memory storing computer-executable instructions. When executed by the processor, the computer-executable instructions cause the processor to control the system to measure a background birefringence of an optical data storage medium held by the sample stage; and adjust the polarization state generator and/or the polarization state analyzer to compensate for the background birefringence.

The system may be referred to as a polarized light microscope. The system may be used to implement a method as described hereinabove.

The computer-executable instructions may cause the processor to perform the method of calibrating a polarized light microscope as discussed above, optionally as part of a method of reading data from a birefringent optical data storage medium as discussed above. The system may implement any of the optional features of these methods, in any combination.

The memory may store computer-executable instructions which, when executed by the processor, cause the processor to optimize a swing angle, $\chi$, of the input state or the detection state after adjusting the polarization state generator and/or the polarization state analyzer to compensate for the background birefringence.

Optimizing the swing angle may comprise determining a degree of polarization, DOP, of light transmitted through a voxel of the optical data storage medium; and adjusting the polarization state generator such that the swing angle of the input state is equal to the arccosine of the degree of polarization or adjusting the polarization state analyzer such that the swing angle of the detection state is equal to the arccosine of the degree of polarization.

The memory may store computer-executable instructions which, when executed by the processor, cause the processor to control the system to measure a residual background birefringence; and adjust the polarization state generator and/or the polarization state analyzer to compensate for the background birefringence.

The system may further comprise a beam splitter, downstream of the sample stage, for splitting the light path into two or more branches. Each of the two or more branches may comprise a respective polarization state analyzer; and a respective detector for detecting light in a respective detection state.

The Present Disclosure Provides the Following Clauses:
Clause 1. A method of calibrating a polarized light microscope, which method comprises:
  placing an optical data storage medium in a sample stage of the polarized light microscope, the optical data storage medium comprising a substrate having birefringent voxels embedded therein;

measuring a background birefringence of the optical data storage medium;
adjusting the polarized light microscope to compensate for the background birefringence.

Clause 2. The method of Clause 1, further comprising, before placing the optical data storage medium in the sample stage, performing a calibration of the polarized light microscope in air.

Clause 3. The method according to Clause 1 or Clause 2, further comprising, after adjusting the polarized light microscope to compensate for the background birefringence, optimizing a swing angle, $\chi$, of a measurement state of the polarized light microscope to compensate for light scattering.

Clause 4. The method according to Clause 3, wherein adjusting the swing angle $\chi$ of the measurement state comprises:
determining a degree of polarization, DOP, of light transmitted through a voxel of the optical data storage medium; and
adjusting the polarized light microscope such that the swing angle of the measurement state is equal to the arccosine of the degree of polarization.

Clause 5. The method according to Clause 3 or Clause 4, wherein the measurement state is a detection state.

Clause 6. The method according to any of Clauses 3 to 5, comprising optimizing a swing angle, $\chi$, of a plurality of measurement states of the polarized light microscope to compensate for light scattering.

Clause 7. The method according to Clause 6, wherein the plurality of measurement states comprises a plurality of input states.

Clause 8. The method according to Clause 7, wherein the plurality of input states comprises two to five different input states.

Clause 9. The method according to any of Clauses 6 to 8, wherein the plurality of measurement states comprises a plurality of detection states.

Clause 8. The method according to Clause 7, wherein the plurality of measurement states comprises two to five different detection states.

Clause 9. The method according to any preceding Clause, wherein adjusting the polarized light microscope to compensate for the background birefringence comprises performing pre-compensation, wherein pre-compensation comprises adjusting the polarized light microscope to tune an input state generated by the polarized light microscope so as to counterbalance a shift in polarization of the input state caused by the background birefringence.

Clause 10. The method according to Clause 9, wherein the pre-compensation comprises adjusting a polarization state generator of the polarized light microscope.

Clause 11. The method according to any preceding Clause, wherein adjusting the polarized light microscope to compensate for the background birefringence comprises performing post-compensation, wherein post-compensation comprises adjusting the polarized light microscope to tune a detection state of the polarized microscope so as to counterbalance a shift in polarization of the input state caused by the background birefringence.

Clause 12. The method according to Clause 11, wherein the post-compensation comprises adjusting a polarization state analyzer of the polarized light microscope.

Clause 13. The method according to any preceding Clause, wherein the background birefringence is measured across a field of view of the polarized light microscope, the field of view encompassing a plurality of voxels.

Clause 14. The method according to any preceding Clause, wherein determining the background birefringence comprises:
illuminating a field of view in the optical data storage medium with light in an input state;
measuring a respective intensity of light in two or more different detection states after transmission of light in the input state through the optical data storage medium;
based on differences in the respective intensities, calculating the background birefringence using a data processor.

Clause 15. The method according to Clause 14, wherein adjusting the polarized light microscope to compensate for the background birefringence comprises modifying the two or more different detection states and/or the input state to balance the respective measured intensities.

Clause 16. The method according to any preceding Clause, wherein determining the background birefringence comprises:
illuminating a field of view in the optical data storage medium with light in two or more different input states;
for the two or more different input states, measuring a respective intensity of light in a detection state transmitted through the optical data storage medium;
based on differences in the respective intensities, calculating the background birefringence using a data processor.

Clause 17. The method according to Clause 16, wherein adjusting the polarized light microscope to compensate for the background birefringence comprises modifying the two or more different input states and/or the detection state to balance the respective measured intensities.

Clause 18. The method according to any preceding Clause, wherein the birefringent voxels are arranged in a stack of layers, the stack comprising a top layer, an intermediate layer, and a bottom layer.

Clause 19. The method according to Clause 18, wherein, during the measurement of the background birefringence, the polarized light microscope is focused on the intermediate layer.

Clause 20. The method according to Clause 18 or Clause 19, wherein the stack includes at least 50 layers of birefringent voxels.

Clause 21. The method according to any preceding Clause, wherein the polarized light microscope is a system as defined in any of Clauses 30 to 34.

Clause 22. A method of reading data from a birefringent optical data storage medium, which method comprises:
placing the birefringent optical data storage medium in a sample stage of a polarized light microscope, wherein the birefringent optical data storage medium comprises a substrate having birefringent voxels embedded therein;
with the birefringent optical data storage medium in a light path of the polarized light microscope, calibrating the polarized light microscope by:
measuring a background birefringence of the optical data storage medium, wherein a voxel is in a light path of the polarized light microscope during the measurement; and
adjusting the polarized light microscope to compensate for the background birefringence;
subsequently using the polarized light microscope to capture an image of a voxel using elliptically-polarized light; and
using a processor, processing the image to recover the data.

Clause 23. The method according to Clause 22, wherein calibrating the polarized light microscope comprises performing a method as defined in any of Clauses 1 to 20.

Clause 24. The method according to Clause 22 or Clause 23, wherein the polarized light microscope is a system as defined in any of Clauses 30 to 34.

Clause 25. The method according to any of Clauses 22 to 24, wherein calibrating the polarized light microscope further comprises:
after adjusting the polarized light microscope to compensate for the background birefringence, optimizing a swing angle, $\chi$, of a measurement state generated by the polarized light microscope by:
determining a degree of polarization, DOP, of light transmitted through a voxel of the optical data storage medium; and
adjusting the polarized light microscope such that the swing angle of the measurement state is equal to the arccosine of the degree of polarization.

Clause 26. The method according to any of Clauses 22 to 25, wherein the optical data storage medium has a plurality of layers of birefringent voxels, and wherein the plurality of layers is on the light path during the measurement of the background birefringence.

Clause 27. The method according to any of Clauses 22 to 26, wherein calibrating the polarized light microscope further comprises, after adjusting the polarized light microscope to compensate for the background birefringence:
measuring a residual background birefringence, wherein a voxel is in a light path of the polarized light microscope during the measurement; and
further adjusting the polarized light microscope to compensate for the residual background birefringence.

Clause 28. A computer program product comprising instructions which, when executed by a processor operably linked to a polarized light microscope, cause the processor to control the polarized light microscope to perform the method of any of Clauses 1 to 27.

Clause 29. The computer program product according to Clause 28, which is embodied in a non-transitory computer-readable medium.

Clause 30. A system for reading data from a birefringent optical data storage medium, which system comprises:
a light source for emitting light along a light path;
a polarization state generator on the light path, the polarization state generator being configured to receive light from the light source and to output elliptically-polarized light in an input state;
a sample stage, wherein the sample stage is configured to hold an optical data storage medium on the light path, downstream of the polarization stage generator;
a polarization state analyzer on the light path downstream of the sample stage;
a light detector for detecting light in a detection state, the light detector being on the light path downstream of the polarization state analyzer; and
a controller comprising a processor and memory storing computer-executable instructions which, when executed by the processor, cause the processor to:
control the system to measure a background birefringence of an optical data storage medium held by the sample stage; and
adjust the polarization state generator and/or the polarization state analyzer to compensate for the background birefringence.

Clause 31. The system according to Clause 30, wherein the computer-executable instructions, when executed by the processor, cause the processor to control the system to perform the method of any of Clauses 1 to 27.

Clause 32. The system according to Clause 30 or Clause 31, wherein the memory further stores computer-executable instructions which, when executed by the processor, cause the processor to:
after adjusting the polarization state generator and/or the polarization state analyzer to compensate for the background birefringence, optimizing a swing angle, $\chi$, of the input state or the detection state, wherein optimizing the swing angle comprises:
determining a degree of polarization, DOP, of light transmitted through a voxel of the optical data storage medium; and
adjusting the polarization state generator such that the swing angle of the input state is equal to the arccosine of the degree of polarization or adjusting the polarization state analyzer such that the swing angle of the detection state is equal to the arccosine of the degree of polarization.

Clause 33. The system according to any of Clauses 30 to 32, wherein the memory further stores computer-executable instructions which, when executed by the processor, cause the processor to:
control the system to measure a residual background birefringence;
adjust the polarization state generator and/or the polarization state analyzer to compensate for the background birefringence.

Clause 34. The system according to any of clauses 30 to 33, wherein the system further comprises a beam splitter, downstream of the sample stage, for splitting the light path into two or more branches;
wherein each of the two or more branches comprises:
a respective polarization state analyzer; and
a respective detector for detecting light in a respective detection state.

Other variants or use cases of the disclosed techniques may become apparent to the person skilled in the art once given the disclosure herein. The scope of the disclosure is not limited by the described embodiments but only by the accompanying claims.

The invention claimed is:

1. A method of calibrating a polarized light microscope, which method comprises:
measuring a background birefringence of an optical data storage medium held by a sample stage of the polarized light microscope, the polarized light microscope comprising a light source, a polarization state generator, the sample stage, a polarization state analyzer, and a light detector, and the optical data storage medium comprising a substrate having birefringent voxels embedded therein; and
adjusting the polarization state generator and/or the polarization state analyzer of the polarized light microscope to compensate for the background birefringence.

2. The method according to claim 1 further comprising, after adjusting the polarized light microscope to compensate for the background birefringence, optimizing a swing angle, $\chi$, of a measurement state of the polarized light microscope to compensate for light scattering.

3. The method according to claim 2, wherein adjusting the swing angle $\chi$ of the measurement state comprises:
determining a degree of polarization of light transmitted through a voxel of the optical data storage medium; and adjusting the polarized light microscope such that the swing angle of the measurement state is equal to an arccosine of the degree of polarization.

4. The method according to claim 2, wherein the measurement state is a detection state.

5. The method according to claim 1, wherein adjusting the polarized light microscope to compensate for the background birefringence comprises performing pre-compensation, wherein pre-compensation comprises adjusting the polarized light microscope to tune an input state generated by the polarized light microscope so as to counterbalance a shift in polarization of the input state caused by the background birefringence, and wherein the pre-compensation comprises adjusting the polarization state generator of the polarized light microscope.

6. The method according to claim 1, wherein adjusting the polarized light microscope to compensate for the background birefringence comprises performing post-compensation, wherein post-compensation comprises adjusting the polarized light microscope to tune a detection state of the polarized light microscope so as to counterbalance a shift in polarization of an input state caused by the background birefringence, and wherein the post-compensation comprises adjusting the polarization state analyzer of the polarized light microscope.

7. The method according to claim 1, wherein the background birefringence is measured across a field of view of the polarized light microscope, the field of view encompassing a plurality of voxels.

8. The method according to claim 1, wherein determining the background birefringence comprises:
    illuminating a field of view in the optical data storage medium with light in an input state;
    measuring respective intensities of light in two or more different detection states after transmission of light in the input state through the optical data storage medium;
    based on differences in the respective intensities, calculating the background birefringence using a data processor;
    wherein adjusting the polarized light microscope to compensate for the background birefringence comprises modifying the two or more different detection states and/or the input state to balance the respective intensities.

9. The method according to claim 1, wherein determining the background birefringence comprises:
    illuminating a field of view in the optical data storage medium with light in two or more different input states;
    for the two or more different input states, measuring respective intensities of light in a detection state transmitted through the optical data storage medium;
    based on differences in the respective intensities, calculating the background birefringence using a data processor.

10. The method according to claim 9, wherein adjusting the polarized light microscope to compensate for the background birefringence comprises modifying the two or more different input states and/or the detection state to balance the respective intensities.

11. The method according to claim 1, wherein the birefringent voxels are arranged in a stack of layers, the stack comprising a top layer, an intermediate layer, and a bottom layer; and
    wherein, during a measurement of the background birefringence, the polarized light microscope is focused on the intermediate layer.

12. The method according to claim 11, wherein the stack includes at least 50 layers of birefringent voxels.

13. A method of reading data from a birefringent optical data storage medium, which method comprises:
    with the birefringent optical data storage medium held by a sample stage of a polarized light microscope such that the birefringent optical data storage medium is in a light path of the polarized light microscope, the polarized light microscope comprising a light source, a polarization state generator, the sample stage, a polarization state analyzer, and a light detector, and the birefringent optical data storage medium comprising a substrate having birefringent voxels embedded therein, calibrating the polarized light microscope by:
        measuring a background birefringence of the optical data storage medium, wherein a voxel is in the light path of the polarized light microscope during a measurement; and
        adjusting the polarization state generator and/or the polarization state analyzer of the polarized light microscope to compensate for the background birefringence;
    subsequently using the polarized light microscope to capture an image of a data-carrying voxel using elliptically-polarized light; and
    using a processor, processing the image to recover the data.

14. The method according to claim 13, wherein calibrating the polarized light microscope further comprises:
    after adjusting the polarized light microscope to compensate for the background birefringence, optimizing a swing angle, x, of a measurement state generated by the polarized light microscope by:
        determining a degree of polarization (DOP) of light transmitted through a voxel of the optical data storage medium; and
        adjusting the polarized light microscope such that the swing angle of the measurement state is equal to an arccosine of the degree of polarization.

15. The method according to claim 13, wherein the optical data storage medium has a plurality of layers of birefringent voxels, and wherein the plurality of layers is on the light path during the measurement of the background birefringence.

16. The method according to claim 13, wherein calibrating the polarized light microscope further comprises, after adjusting the polarized light microscope to compensate for the background birefringence:
    measuring a residual background birefringence, wherein a voxel is in the light path of the polarized light microscope during the measurement; and
    further adjusting the polarized light microscope to compensate for the residual background birefringence.

17. A system for reading data from a birefringent optical data storage medium, which system comprises:
    a light source for emitting light along a light path;
    a polarization state generator on the light path, the polarization state generator being configured to receive light from the light source and to output light in a circularly- or elliptically-polarized input state;
    a sample stage, wherein the sample stage is configured to hold an optical data storage medium on the light path, downstream of the polarization stage generator;
    a polarization state analyzer on the light path downstream of the sample stage;
    a light detector for detecting light in a detection state, the light detector being on the light path downstream of the polarization state analyzer; and a controller comprising a processor and memory storing computer-executable instructions which, when executed by the processor, cause the processor to:
control the system to measure a background birefringence of the optical data storage medium held by the sample stage; and
adjust the polarization state generator and/or the polarization state analyzer to compensate for the background birefringence.

18. The system according to claim 17, wherein the memory further stores computer-executable instructions which, when executed by the processor, cause the processor to:
after adjusting the polarization state generator and/or the polarization state analyzer to compensate for the background birefringence, optimizing a swing angle, x, of the input state or the detection state, wherein optimizing the swing angle comprises:
determining a degree of polarization (DOP) of light transmitted through a voxel of the optical data storage medium; and
adjusting the polarization state generator such that the swing angle of the input state is equal to an arccosine of the degree of polarization or adjusting the polarization state analyzer such that the swing angle of the detection state is equal to the arccosine of the degree of polarization.

19. The system according to claim 17, wherein the memory further stores computer-executable instructions which, when executed by the processor, cause the processor to:
control the system to measure a residual background birefringence;
adjust the polarization state generator and/or the polarization state analyzer to compensate for the background birefringence.

20. The system according to claim 17, wherein the system further comprises a beam splitter, downstream of the sample stage, for splitting the light path into two or more branches;
wherein each of the two or more branches comprises:
a respective polarization state analyzer; and
a respective detector for detecting light in a respective detection state.

* * * * *